US006214449B1

(12) United States Patent
Otani et al.

(10) Patent No.: US 6,214,449 B1
(45) Date of Patent: Apr. 10, 2001

(54) INK JET RECORDING PAPER

(75) Inventors: Teiichi Otani; Atsushi Ono; Noboru Kondo, all of Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/280,720

(22) Filed: Mar. 30, 1999

(30) Foreign Application Priority Data

Mar. 31, 1998 (JP) .......................... 10-105665

(51) Int. Cl.[7] .......................... B32B 5/00

(52) U.S. Cl. .......................... 428/218; 428/195; 428/211; 428/331

(58) Field of Search .......................... 428/195, 211, 428/212, 218, 331

(56) References Cited

FOREIGN PATENT DOCUMENTS 55-11829 * 1/1980 (JP) .
57-107879 * 7/1982 (JP) .
58-110287 * 6/1983 (JP) .

* cited by examiner

*Primary Examiner*—Bruce H. Hess
(74) *Attorney, Agent, or Firm*—Millen, White, Zelano & Branigan, P.C.

(57) ABSTRACT

An ink jet recording paper having on at least one side of a base paper at least two ink-receiving layers which each comprise a pigment and a resin as main components; the topmost layer of said ink-receiving layers having a thickness of 5 $\mu$m to less than 25 $\mu$m and a density of 0.4 g/cm$^3$ to 0.6 g/cm$^3$ and the ink-receiving layer arranged underneath said topmost layer having a density higher than the density of the topmost layer by 0.05 g/cm$^3$ to 0.5 g/cm$^3$, thereby acquiring high suitability for full-color ink jet printer of photo type.

11 Claims, No Drawings

INK JET RECORDING PAPER

FIELD OF THE INVENTION

The present invention relates to a material on which images are recorded with water base ink and, more particularly, to an ink jet recording paper which has high ink absorbency, but generates no cockles, thereby ensuring smooth traveling even in full-color printing and high color developability comparable to that in silver halide photography for the images recorded thereon by full-color printing.

BACKGROUND OF THE INVENTION

As an ink jet recording method comprises jetting fine drops of ink using some of various mechanisms to form images on a recording material, the adoption thereof makes it easy to increase a recording speed and form multicolor images, and further the method requires only inexpensive apparatus. Such being the case, the ink jet recording system has acquired a remarkable popularity in recent years. In particular, recent full-color ink jet printers have achieved great reduction in ink drop size and considerable improvement in ink properties to realize the printing of high quality, including high definition and high gradation comparable to those of silver halide photography.

More specifically, the latest main-current ink jet printers having image reproducibility comparable to that of photography (hereinafter referred to as ink jet printers of photo type) are designed so that, in a highlight section of image, each minute region hitherto reproduced by one concentrated ink drop is depicted by several dilute ink drops to reduce a grainy feeling, thereby increasing their image quality. Accordingly, the amount of ink jetted in such printers is greater than that in conventional printers, so that much higher ink absorbency than before is required for recording paper.

With respect to the ink jet recording paper, on the other hand, various arts of letting the so-called coated paper, or paper having an ink-receiving layer on a base paper, have both ink absorbency and color developability as basic factors of ink jet recording suitability have so far been developed.

For instance, as the coated paper having at least two ink-receiving layers on a substrate, the recording sheet in which the ink absorbing speed of the outermost ink-receiving layer is restricted and the second layer arranged on the inner side has a higher ink absorbing speed than the outermost layer, thereby enabling the ink to penetrate deeply into the sheet, is disclosed in Japanese Tokkai Sho 55-11829 (the term "Tokkai" as used herein means an "unexamined published patent application"), the coated paper having a coating composition coated in a double layer on the same side of a substrate is disclosed in Japanese Tokkai Sho 57-107879, and the coated paper wherein the hole distribution in an ink-receiving layer is localized in specified regions is disclosed in Japanese Tokkai Sho 58-110287.

However, those coated papers provide low image densities when they are subjected to ink jet recording, and are inferior in color developability to sensitized papers for silver halide photography. In particular, the recording on conventional ink jet recording papers with ink jet printers of photo type gives rise to running of ink due to shortage of ink absorbency in those recording papers, and further causes deterioration in traveling properties of the recording papers due to cockles and undulations generated therein after recording by the ink penetrating into their base papers in an increased quantity. In an extreme case, part of the recording paper is scraped with a printing head to leave stains on images printed.

For the purpose of heightening the ink absorbency, the thickness of an ink-receiving layer is generally increased. However, increasing the thickness of an ink-receiving layer results in lowering not only the image density but also surface strength of the ink-receiving layer. Decrease in the surface strength causes problems, e.g., such that the powdery components in the surface region tend to come off. In addition, the cost of production is raised by increasing the thickness. For the purpose of elevating the surface strength, on the other hand, increasing the proportion of an aqueous binder in the ink-receiving layer results in lowering the ink absorbency. Therefore, it is not yet achieved to develop an ink jet recording paper which raises neither ink-bleeding nor ink-overflowing problem, provides highly developed color images comparable to those in silver halide photography and ensures smooth traveling when subjected to printing operations with an ink jet printer of photo type.

SUMMARY OF THE INVENTION

Therefore, an object of the present invention is to provide an ink jet recording paper which causes neither a traveling trouble nor coming-off of a coated layer, is free from bleeding and overflowing of ink, and can have highly developed color images comparable or superior to those in color photography when it undergoes printing operations using an ink jet printer of photo type.

The above-described object of the present invention is attained by an ink jet recording paper having on at least one side of a base paper at least two ink-receiving layers which each comprise a pigment and a resin as main components; the topmost layer of said ink-receiving layers having a thickness of 5 $\mu$m to less than 25 $\mu$m and a density of 0.4 g/cm$^3$ to 0.6 g/cm$^3$ and the ink-receiving layer arranged underneath said topmost layer having a density higher than the density of the topmost layer by 0.05 g/cm$^3$ to 0.5 g/cm$^3$.

DETAILED DESCRIPTION OF THE INVENTION

In the case of ink jet recording, the formation of a thick ink-receiving layer with the intention of elevating the ink absorbency of a recording material generally causes the lowering of image density and deterioration in color developability. A reason why these phenomena are caused can be explained as follows: The ink jetted onto a recording material penetrates vertically into the ink-receiving layer and little causes the spread of each ink dot on the recording material; as a result, the density of an image as a mass of ink dots is lowered. On the other hand, when the ink-receiving layer is reduced in thickness with the intention of heightening the image density, the ink can spread horizontally over the ink-receiving layer surface to increase the diameter of each dot; as a result, though the image density can be heightened, the image quality is lowered because the lines printed are too thick and the solid areas are uneven in density. Therein, as a matter of course, the ink absorbency is lowered.

For the purpose of obtaining recorded images of high quality comparable to that in silver halide photography, it is insufficient to heighten only the so-called apparent density of an image as a mass of ink dots, and so it is necessary to heighten the substantial image density, namely dot density. In heightening the dot density, it is effective to form an ink-receiving layer having high transparency. In general, pigments having a small grain size, such as alumina sol, are employed for the formation of highly transparent ink-receiving layer. However, the small grain size of a pigment is responsible for low ink absorbency to raise ink-bleeding and ink-overflowing problems. The ink absorbency can be improved by heightening the proportion of a pigment used in the ink-receiving layer, but the use of such an expensive pigment in a large quantity is unsuitable for the production of cheap recording papers.

For achieving a high dot density, it is also effective to lower the density of an ink-receiving layer, thereby forming voids for gathering ink. More specifically, when the voids are increased in number by lowering the density of the ink-receiving layer, the ink density per unit volume in the ink-receiving layer can be increased even when synthetic silica as a relatively cheap pigment is employed, resulting in heightening the dot density.

However, if only the ink-receiving layer having a low density and a thickness great enough to meet the ink absorbency requirement is formed on a base paper, decrease in surface strength raises problems, e.g., such that the coated layer comes off. In an extreme case, a paper sheet-feeding trouble occurs wherein part of the coated layer is transferred onto a sheet-feeding roller, making it impossible to feed recording papers. In the present invention, therefore, the ink-receiving layer is formed so as to have a multilayer structure constituted of at least two layers differing in density, and thereby high ink absorbency, high image density, high surface strength and reduction in production cost can be attained.

The base paper used in the present invention has no particular restriction, but any types of base paper can be used as long as they are made from a mixture of pulp (e.g., chemical pulp such as LBKP and NBKP, mechanical pulp manufactured by GP, TMP or like method, or waste paper pulp), a filler, a sizing agent and various kinds of additives including a paper strength reinforcing agent, by means of a Fourdrinier paper machine, a cylinder paper machine or the like. Further, starch or another surface sizing agent may be provided on base paper by the use of a size press or another coating means. Additionally, in cases where the ink absorbency of base paper itself is taken into account, it is desirable to utilize base paper having a sizing degree of at most 50 seconds and a filler content of at least 10 weight %.

The ink-receiving layers provided on such base paper comprises a pigment and a water-soluble binder as main components. In order to impart water resistance to the images recorded therein, it is advantageous that the ink-receiving layers further contains a dye-fixing agent, a waterproof providing agent and the like. Examples of a pigment suitable for the ink-receiving layers include precipitated calcium carbonate, ground calcium carbonate, kaoline, clay, talc, titanium dioxide, zinc oxide, zinc carbonate, satin white, magnesium silicate, calcium silicate, aluminum silicate, aluminum hydroxide, alumina, pseudo boehmite, synthetic amorphous silica, magnesium carbonate, zeolite and other white pigments.

Of the pigments as recited above, pigments having a water absorption factor (the definition of which is described hereinafter) of from 2 to 4, especially from 2.5 t 3.5, are used to advantage over others from the viewpoints of absorbency, color developability and easiness of handling. In the present invention, such pigments may be used individually or as a mixture of two or more thereof. In the case of using a mixture of pigments, it is desirable that the average of water absorption factors of pigments mixed be from 2 to 4, especially from 2.5 to 3.5, similarly to the cases of using pigments independently.

When the water absorption factor is smaller than 2, the ink absorbency is lowered to cause bleeding and overflowing phenomena. When the water absorption factor is greater than 4, on the other hand, the viscosity of a pigment dispersion is heightened, and so the solids content in a coating color cannot be raised. As a result, problems, such that it is unavoidable to decrease the coating speed of the color and the products obtained has low surface strength, are caused.

In view of the balance between color developability, ink absorbency and production cost, it is especially desirable to use synthetic amorphous silica as a pigment in the topmost layer of ink-receiving layers according to the present invention.

The water-soluble binder used in ink-receiving layers can be selected properly from known binders which can be dissolved or dispersed homogeneously into water and form films after drying. Examples of such a binder include polyvinyl alcohol and derivatives thereof such as silyl-modified polyvinyl alcohol, casein, soya bean protein, starch derivatives such as oxidized starch, starch phosphate and etherified starch, cellulose derivatives such as carboxymethyl cellulose and hydroxyethyl cellulose, various kinds of latexes such as styrene-butadiene copolymer, homo- and copolymers of acrylates or methacrylates, and ethylene-vinyl acetate copolymers, and polyurethane resins.

With respect to the dye fixing agent incorporated in ink receiving layers for conferring water resistance upon images, cationic dye fixing agents are employed to particular advantage. Examples of such a cationic dye fixing agent include cationic resins of various kinds, such as cationic polyacrylamide, polyethyleneimine and polyamide-polyamine epichlorohydrin. Besides the foregoing ingredients, pigment dispersing agents, anti-foaming agents, ultraviolet absorbents and coloring materials, such as colored pigments and fluorescent dyes, can be add to the ink-receiving layers of the present ink jet recording paper, if desired.

In the present invention, the topmost ink-receiving layer having a density of 0.4 to 0.6 g/cm$^3$ and a thickness of 5 to less than 25 $\mu$m is a layer having a high ink-absorbing speed to provide a high image density (hereinafter referred to as "color developing layer"), and the ink-receiving layer arranged underneath the color developing layer and having a density higher than that of the color developing layer by 0.05 to 0.5 g/cm$^3$ is a layer having a low ink-absorbing speed but excellent ink absorption (hereinafter referred to as "absorption layer"). The densities of these ink receiving layers can be controlled by properly choosing the water absorption factors of pigments used as a main component and the water-soluble resin/pigment ratio by weight, and carrying out a calendering operation under appropriate conditions.

When the density of the color developing layer is lower than 0.4 g/m$^3$, it is frequently noticed that the coated layer comes off and, in the extreme case, the surface strength is so low that the coated layer adheres to fingers when very slightly touched thereon by hand. This tends to arise paper-conveying troubles in a printer. On the other hand, the color developing layer having a density higher than 0.6 g/cm$^3$ is undesirable because of too low image density therein.

Further, the ink absorption of the color developing layer is decreased when the thickness thereof is less than 5 $\mu$m; while the printed image density in the color developing layer is lowered when the thickness thereof is not less than 25 $\mu$m. In particular, it is advantageous that the present color developing layer has a thickness of 10 to 20 $\mu$m.

Even when the density and the thickness of the color developing layer are adjusted to the aforesaid ranges respectively, high color developability and high surface strength cannot be attained together unless the absorption layer provided underneath the color developing layer is controlled so as to have its density in the range specified above.

When the difference between the densities of absorption layer and color developing layer is less than 0.05 g/cm$^3$, no significant difference comes out in the ink absorbing speed of these two layers, or the ink absorbing speed of the absorption layer becomes faster than that of the color developing layer. As a result, the ink can penetrate into a deeper part to lower the apparent image density.

In addition, as the absorption layer has a high ink absorbing speed comparable with that of the color developing layer, the binder component in a coating composition for the color developing layer is easily soaked into the absorption layer when providing the color developing layer on the absorption layer. As a result, the binder remaining in the color developing layer is reduced in quantity, and thereby the surface strength is lowered.

Conversely, when the density of the absorption layer is higher than that of the color developing by a value beyond 0.5 g/cm$^3$, bleeding and overflowing of ink are caused. In the present invention, it is especially desirable that the density of the absorption layer be higher than that of the color developing layer by 0.1 to 0.4 g/cm$^3$.

As a means to provide the present ink receiving layers on the surface of base paper, various types of coating machines, such as a roll coater, a blade coater, a curtain coater, an air knife coater, a gravure coater, a bar coater, a rod blade coater and a gate roll coater, can be used in either on-machine or off-machine form. Further, for the surface finishing of the ink receiving layers, various types of calendering machines, such as a machine calender, a TG calender, a soft calender and a supercalender, can be used individually or as a combination in either on-machine or off-machine form.

In accordance with the present invention, ink jet recording papers can reproduce images of high quality comparable with photographic images as they have no problems with respect to the ink absorbency and traveling properties as fundamental suitability for ink jet printers and, what is more, the combination of ink absorption layers therein enables the acquisition of both high ink absorption power enough for an ink jet printer of photo type and very high color developability.

The present invention will now be illustrated in more detail by reference to the following examples. However, the invention should not be construed as being limited to these examples. Unless otherwise noted, all "%" and all "parts" in the examples are by weight.

The following are methods adopted for evaluating the ink jet recording papers prepared below:

1) Measurement of Ink-Receiving Layer Thickness

A square sample piece measuring 10 cm by 10 cm is cut out from a recording paper, and allowed to stand for 24 hours in the atmosphere of 20° C. and 65% RH to adjust its moisture content. Then, the sample piece is examined for thickness according to JIS-P8118. First the thickness of the recording paper as a whole (a1 μm) is measured and then, after all the ink-receiving layers are scraped off the sample piece with a razor's edge, the thickness of residual sample piece (b1 μm) is measured. The difference between these thickness values (a1-b1 μm) is calculated, and defined as the total thickness of ink-receiving layers (c1 μm).

2) Measurement of Ink-Receiving Layer Density (i) In analogy with the thickness measurement described above, square sample pieces measuring 10 cm by 10 cm are cut out from a recording paper, and allowed to stand for 24 hours in the atmosphere of 20° C. and 65% RH to adjust their moisture content. Then, one sample piece is dried for 20 minutes while sending 110° C. air thereto with a dryer, and then the absolute dry weight thereof (A gram) is measured.

(ii) The ink-receiving layers are scraped off another sample piece with a razor's edge, and the absolute dry weight of the residual sample piece (B gram) is measured under the condition described (i).

The density of the ink-receiving layers (D) is calculated from the values measured above according to the following equation:

Ink-receiving layer density (D g/cm$^3$)=Decrease in absolute dry weight (A−B g)/Ink-receiving layer thickness (c1×10$^{-4}$ cm)×area (100 cm$^2$)

In determining the thickness and the density of a color developing layer, the color developing layer alone is scraped off the recording paper, and the aforementioned procedures are carried out. Herein, if the color developing layer to be examined is colored by the addition of a coloring agent to its coating composition, the operations can be made easy. Further, the determination of the thickness and the density of an absorption layer is made by preparing a paper coated with the absorption layer alone and subjecting the paper to the aforementioned procedures.

3) Measurement of Water Absorption Factor of Pigment (1) About 1 g of a pigment is put in an aluminum foil-made pan, the moisture therein is evaporated in a drying oven, and then the weight of the pigment (A gram) is measured accurately with an electronic balance.

(2) A small amount of ion exchange water is dripped into the pigment put in the aluminum foil-made pan, and the weight thereof is measured. Then, the pigment and water are kneaded.

(3) The operations carried out in (2) are repeated till the kneaded matter starts flowing.

(4) The total amount of water dripped until the kneaded matter is on the point of flowing (B gram) is determined. And the water absorption factor is defined as a quotient of the total amount of dripped water divided by the weight of the pigment, namely B/A.

4) Color Developability

On a recording paper cut long into sheets of A4-size, solid image patterns of black, cyan and magenta and yellow colors are printed with a full-color ink jet printer, DeskJet 694c (trade name, a product of HEWLETT PACKARD), and optical densities of the color images printed are each measured with a Macbeth densitometer. The color developability is evaluated by the average of four measurements.

The evaluation criteria adopted herein are the following:

◎: The average optical density of four colors is at least 1.5.

○: The average optical density of four colors is from 1.3 to no higher than 1.5.

Δ: The average optical density of four colors is from 1.1 to no higher than 1.3.

×: The average optical density of four colors is no higher than 1.1.

5) Ink Absorption

Patterns having a boundary between magenta and green solid images are printed using a full-color ink jet printer, Model BJC-420J (trade name, a product of Canon Inc.) and photo ink, and are examined for bleeding at the boundary by visual observation.

The evaluation criteria adopted herein are the following:

⊚: No bleeding at the boundary is observed at all.

○: Bleeding at the boundary is hardly observed.

Δ: Bleeding at the boundary is more or less observed.

×: Bleeding at the boundary is markedly observed.

6) Surface Strength

An adhesive tape is applied to the recorded side of a recording paper, and rubbed intensely 20 times with a rubber roller. The tape-applied recording paper is fixed to a spring balance at one end thereof, and the peel strength in the direction of 180 degrees is measured.

The evaluation criteria adopted herein are the following:

⊚: The peel strength is at least 500 g.

○: The peel strength is from 300 g to no more than 500 g.

Δ: The peel strength is from 200 g to no more than 300 g.

×: The peel strength is less than 200 g.

EXAMPLE 1

Pulp slurry prepared by mixing 95 parts of LBKP and 5 parts of NBKP and beating the pulp mixture so as to have a Canadian standard freeness of 430 ml was admixed with 0.4 parts of rosin sizing agent, 1.5 parts of aluminum sulfate and 15 parts of calcium carbonate, and therefrom a base paper was made using a Fourdrinier paper machine. The paper thus made was subjected to pre-drying with a cylinder dryer, and further coated with oxidized starch on both sides at the total coverage of 2.3 g/m$^2$ by means of a size press. Then, the resulting paper was dried with an after-dryer, and further subjected to machine calendering so that the surface smoothness was adjusted to 35 seconds. Thus, the paper having a final basis weight of 105 g/m$^2$ was obtained as a base paper.

For an absorption layer, a coating composition having a solids concentration of 20% was prepared by mixing 100 parts of synthetic amorphous silica having a water absorption factor of 2.2 (Syloid 621, trade name, produced by Grace Davison Inc.), 25 parts of polyvinyl alcohol as a water-soluble binder (PVA 117, trade name, produced by Kuraray Co. Ltd.), 5 parts of acrylic emulsion, 6 parts of a cationic quaternary ammonium salt polymer as a dye fixer, 5 parts of cationic styrene-acrylic resin as a sizing agent and appropriate amounts of a fluorescent dye and a blueing dye.

The coating composition obtained was coated and dried on the base paper obtained above by means of a bar blade coater, and then processed with a soft calender under a line pressure of 80 kg/cm to provide an absorption layer having a thickness of 12 μm. At this stage, the absorption layer was scraped off from the base paper, and examined for density. Thus, the absorption layer was found to have a density of 0.60 g/cm$^3$.

For forming a color developing layer, a coating composition having a solids concentration of 18% was prepared by mixing 100 parts of synthetic amorphous silica having a water absorption factor of 3.2 (Finesil X-37B, trade name, produced by Tokuyama Co. Ltd.), 15 parts of polyvinyl alcohol as a water-soluble binder (PVA 117, trade name, produced by Kuraray Co. Ltd.), 2 parts of acrylic emulsion, 5 parts of a cationic quaternary ammonium salt polymer as a dye fixer, 3 parts of cationic styrene-acrylic resin as a sizing agent and appropriate amounts of a fluorescent dye and a blueing dye.

The coating composition obtained was coated and dried on the absorption layer by means of an air knife coater, and then dried with a floating dryer till the moisture content in the coated layer was decreased to 5%. Further, the coating was processed at ordinary temperature by means of a soft calender under a line pressure of 100 kg/cm. Thus, an ink jet recording paper having on the absorption layer a color developing layer 7 μm in thickness was obtained. By the density measurement as mentioned hereinbefore, the color developing layer in this recording layer was found to have a density of 0.40 g/cm$^3$.

EXAMPLE 2

An ink jet recording paper was prepared in the same manner as in Example 1, except that the coating composition for the color developing layer was applied so as to have a dry thickness of 15 μm.

EXAMPLE 3

An ink jet recording paper was prepared in the same manner as in Example 1, except that the coating composition for the color developing layer was applied so as to have a dry thickness of 20 μm.

EXAMPLE 4

A coating composition for the absorption layer was prepared in the same manner as in Example 1, except that the pigment used was changed to the mixture of 50 parts of precipitated calcium carbonate (Carlite KT, trade name, produced by SHIRAISHI KOGYO KAISRA LTD.) and 50 parts of synthetic amorphous silica (BS304N, trade name, produced by Shionogi Seiyaku Co., Ltd.) and the amount of polyvinyl alcohol added was changed to 20 parts. The coating composition thus prepared was coated in the same manner as in Example 1 to form an absorption layer having a density of 0.80 g/cm$^3$ and a thickness of 10 μm. on this absorption layer, a color developing layer was coated in the same manner as in Example 1, except that the thickness thereof was changed to 15 μm, thereby preparing an ink jet recording paper.

EXAMPLE 5

A coating composition for the absorption layer was prepared in the same manner as in Example 1, except that the pigment used was replaced by precipitated calcium carbonate (Carlite KT) and the amount of polyvinyl alcohol added was changed to 28 parts. And a coating composition for the color developing layer was prepared in the same manner as in Example 1, except that the pigment used was replaced by a mixture of 40 parts of synthetic amorphous silica having a water absorption factor of 3.2 (Finesil X-37B, trade name, produced by Tokuyama Co. Ltd.) and 60 parts of synthetic amorphous silica having a water absorption factor of 2.2 (Mizukasil P-50, trade name, produced by Mizusawa Silica Co., Ltd.). Additionally, the average water absorption factor of the color developing layer was 2.5.

An ink jet recording paper was prepared by coating those coating compositions under the same conditions as adopted respectively in Example 1 to form an absorption layer having a thickness of 12 μm and a density of 0.90 g/cm$^3$ and a color developing layer having a thickness of 20 μm and a density of 0.60 g/cm$^3$.

EXAMPLE 6

An ink jet recording paper was prepared in the same manner as in Example 2, except that the density of the color developing layer was adjusted to 0.50 g/cm$^3$ by changing the pigment used therein to a mixture of 50 parts of synthetic amorphous silica having a water absorption factor of 3.2 (Finesil X-37B, trade name, produced by Tokuyama Co. Ltd.) and 50 parts of synthetic amorphous silica having a water absorption factor of 2.2 (Mizukasil P-50, trade name, produced by Mizusawa Silica Co., Ltd.). Additionally, the average water absorption factor of the color developing layer was 2.7.

EXAMPLE 7

An ink jet recording paper was prepared in the same manner as in Example 6, except that the density of the absorption layer was adjusted to 0.8 g/cm$^3$ in the same way as in Example 4.

EXAMPLE 8

An ink jet recording paper was prepared in the same manner as in Example 4, except that the density of the color developing layer was adjusted to 0.45 g/cm$^3$ by changing the pigment used therein to a mixture of 55 parts of synthetic amorphous silica having a water absorption factor of 4.5 (FK500LS, trade name, produced by Degussa Inc.) and 45 parts of synthetic amorphous silica having a water absorption factor of 3.2 (Finesil X-37B, trade name, produced by Tokuyama Co. Ltd.). Additionally, the average water absorption factor of the color developing layer was 3.9.

COMPARATIVE EXAMPLE 1

An ink jet recording paper was prepared in the same manner as in Example 1, except that the thickness of the color developing layer was changed to 25 $\mu$m.

COMPARATIVE EXAMPLE 2

An ink jet recording paper was prepared in the same manner as in Example 1, except that the thickness of the color developing layer was changed to 4 $\mu$m.

COMPARATIVE EXAMPLE 3

The same coating composition as used for forming the color developing layer in Example 6 was coated and dried in the same manner as in Example 1 using a bar blade coater, thereby forming a coated layer having a thickness of 15 $\mu$m. On this coated layer, the same coating composition as described above was coated with an air knife coater, and then dried in the same manner as in Example 6 to form a coated layer having a thickness of 15 $\mu$m. Thus, an ink jet recording paper wherein the absorption layer and the color developing layer had the same density of 0.50 g/cm$^3$ was obtained.

COMPARATIVE EXAMPLE 4

An ink jet recording paper was prepared in the same manner as in Example 4, except that the color developing layer of Example 4 was used as an ink absorption layer and the ink absorption layer of Example 4 was used as a color developing layer. In other words, the absorption layer of the recording paper obtained had a density of 0.40 g/cm$^3$ and the color developing layer thereof had a density of 0.80 g/cm$^3$.

COMPARATIVE EXAMPLE 5

An ink jet recording paper was prepared in the same manner as in Example 2, except that the density of the abortion layer was adjusted to 0.95 g/cm$^3$ by changing the pigment used therein to 100 parts of precipitated calcium carbonate (Carlite KT) alone and the amount of the polyvinyl alcohol used to 16 parts.

COMPARATIVE EXAMPLE 6

An ink jet recording layer was prepared in the same manner as in Example 2, except that the density of the color developing layer was adjusted to 0.35 g/cm$^3$ by changing the pigment used therein to 100 parts of synthetic amorphous silica having a water absorption factor of 5.0 (Sylojet P403, trade name, produced by Grace Davison Inc.) alone.

The color developability, the ink absorption and the surface strength of each of the ink jet recording papers prepared in Examples and Comparative Examples were measured using the methods mentioned above respectively. The results obtained are shown in Table 1.

The experimental results shown in Table 1 prove that the ink jet recording papers according to the present invention have distinct advantages over the others.

TABLE 1

| | Thickness of topmost ink- | Density of ink-receiving layer g/cm$^3$) | | | Water absorption factor | | | |
|---|---|---|---|---|---|---|---|---|
| | receiving layer ($\mu$m) | Color developing layer | Absortion layer | Difference | of pigment (%) | Color developability | Ink absorption | Surface strength |
| Example 1 | 7 | 0.40 | 0.60 | 0.20 | 3.2 | ⊚ | ⊚ | ○ |
| Example 2 | 15 | 0.40 | 0.60 | 0.20 | 3.2 | ⊚ | ⊚ | ○ |
| Exmaple 3 | 20 | 0.40 | 0.60 | 0.20 | 3.2 | ○ | ⊚ | ○ |
| Example 4 | 15 | 0.40 | 0.80 | 0.40 | 3.2 | ⊚ | ⊚ | ○ |
| Example 5 | 20 | 0.60 | 0.90 | 0.30 | 2.5 | ○ | ○ | ○ |
| Example 6 | 15 | 0.50 | 0.60 | 0.10 | 2.7 | ⊚ | ○ | ○ |
| Example 7 | 15 | 0.50 | 0.80 | 0.30 | 2.7 | ⊚ | ○ | ○ |
| Example 8 | 15 | 0.45 | 0.80 | 0.35 | 3.9 | ○ | ○ | ⊚ |
| Compar.Ex.1 | 25 | 0.40 | 0.60 | 0.20 | 3.2 | Δ | ⊚ | X |
| Compar.Ex.2 | 4 | 0.40 | 0.60 | 0.20 | 3.2 | ⊚ | X | ○ |
| Compar.Ex.3 | 15 | 0.50 | 0.50 | 0 | 2.7 | X | ○ | Δ |
| Compar.Ex.4 | 10 | 0.80 | 0.40 | −0.40 | 1.5 | X | Δ | ○ |
| Compar.Ex.5 | 15 | 0.40 | 0.95 | 0.55 | 3.2 | ○ | X | ○ |
| Compar.Ex.6 | 15 | 0.35 | 0.60 | 0.25 | 5.0 | ⊚ | ⊚ | X |

What is claimed is:

1. An ink jet recording paper having on at least one side of a base paper at least two ink-receiving layers which each comprise a pigment and a resin as main components; the topmost layer of said ink-receiving layers having a thickness of 5 μm to less than 25 μm and a density of 0.4 g/cm$^3$ to 0.6 g/cm$^3$ and the ink-receiving layer arranged underneath said topmost layer having a density higher than the density of the topmost layer by 0.05 g/cm$^3$ to 0.5 g/cm$^3$.

2. An ink jet recording paper according to claim 1, wherein the pigment contained in the topmost ink-receiving layer has a water absorption factor of from 2.0 to 4.0.

3. An ink jet recording paper according to claim 1, wherein the topmost ink-receiving layer has a thickness of 10 μm to 20 μm.

4. An ink jet recording paper according to claim 2, wherein the water absorption factor of the pigment in the topmost ink-receiving layer is from 2.5 to 3.5.

5. An ink jet recording paper according to claim 2, wherein the pigment contained in the topmost ink-receiving layer is synthetic amorphous silica.

6. An ink jet recording paper according to claim 1, wherein the base paper has a sizing degree of 50 seconds or below and a filler content of at least 10 weight %.

7. An ink jet recording paper according to claim 1, wherein the ink-receiving layers further comprise at least one of a dye-fixing agent and a waterproof providing agent.

8. An ink jet recording paper according to claim 7, wherein the dye-fixing agent is present and is a cationic dye-fixing agent.

9. An ink jet recording paper according to claim 8, wherein the dye-fixing agent is cationic polyacrylamide, polyethyleneimine or polyamide polyamine epichlorohydrin.

10. An ink jet recording paper according to claim 1, wherein the pigment in one or more of the ink receiving layers is precipitated calcium carbonate, ground calcium carbonate, kaoline, clay, talc, titanium dioxide, zinc oxide, zinc carbonate, satin white, magnesium silicate, calcium silicate, aluminum hydroxide, alumina, pseudo boehmite, synthetic amorphous silica, magnesium carbonate, zeolite or another white pigment.

11. An ink jet recording paper according to claim 1, wherein the density of the ink-receiving layer has a density higher than the density of the topmost layer by 0.1 to 0.4 gm/cm$^3$.

* * * * *